C. W. BALL & T. DAVIS.

VEHICLE WHEEL.

No. 9,994. Reissued Jan. 3, 1882.

Witnesses:
F. M. Burnham
George Connell

Inventor:
Charles W. Ball
and Thomas Davis
by J. S. Zerbe, their Atty.
per L. Deane, Assoc N. PETERS, Photo-Lithographer, Washington, D. C.

UNITED STATES PATENT OFFICE.

CHARLES W. BALL AND THOMAS DAVIS, OF MACON, ILLINOIS.

VEHICLE-WHEEL.

SPECIFICATION forming part of Reissued Letters Patent No. 9,994, dated January 3, 1882.

Original No. 241,276, dated May 10, 1881. Application for reissue filed July 8, 1881.

DIVISION A.

*To all whom it may concern:*

Be it known that we, CHARLES W. BALL and THOMAS DAVIS, of Macon, in the county of Macon and State of Illinois, have invented certain new and useful Improvements in Vehicle-Wheels; and we do hereby declare the following to be a full, clear, and exact description thereof, that will enable others skilled in the art to which it appertains to make and use the same, reference being had to the accompanying drawings, and to the letters of reference marked thereon, which form a part of this specification.

Figure 1:
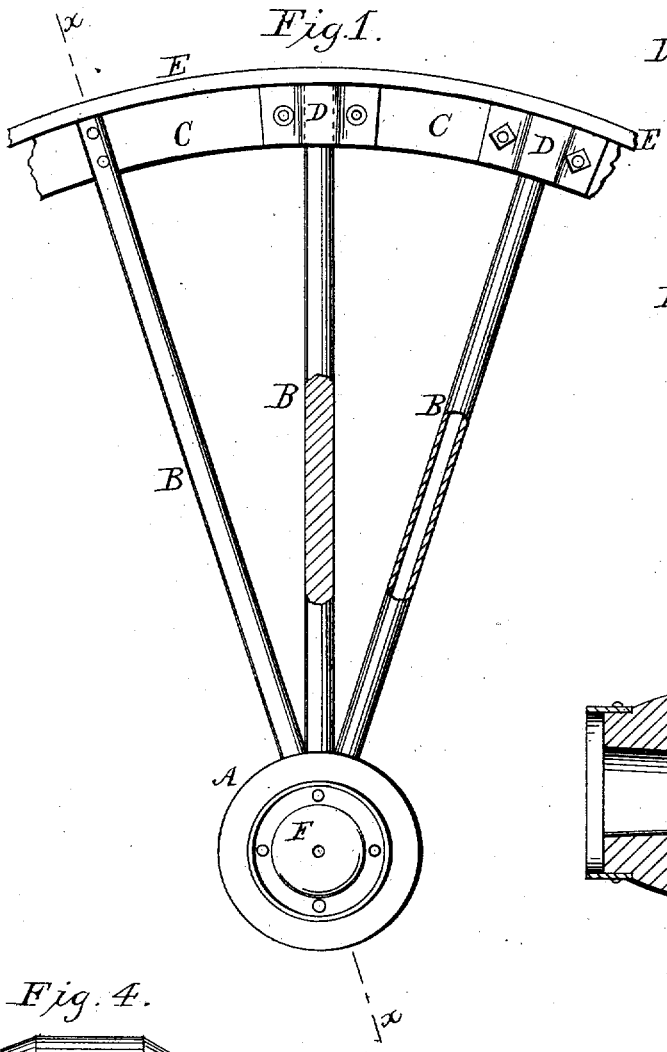
Figure 2:
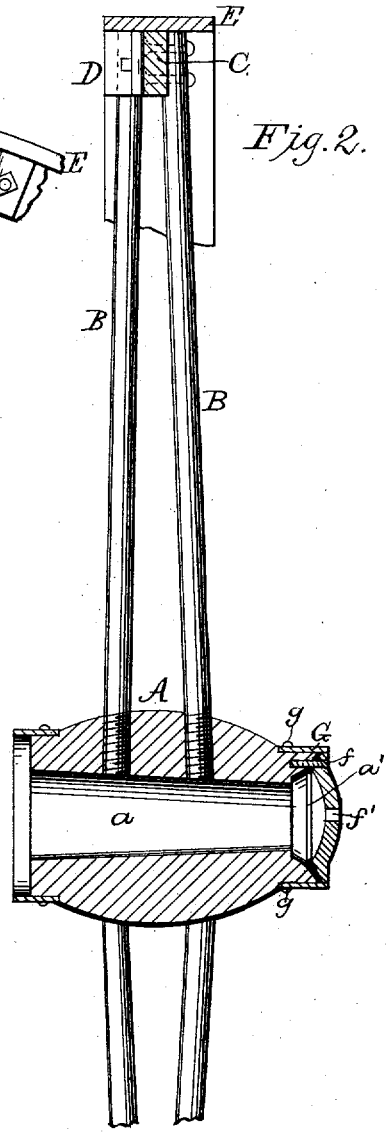
Figure 4:
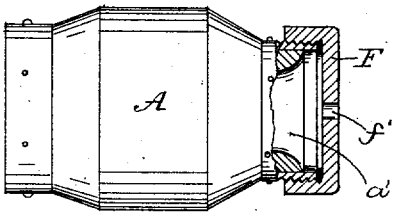
Figure 3:
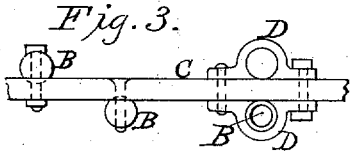

Figure 1 is a side elevation of a part of one of our improved wheels. Fig. 2 is a sectional elevation taken through line *x x*, Fig. 1. Fig. 3 is a plan view of a part of the wheel. Fig. 4 represents a modification of the oiler.

Similar letters of reference indicate corresponding parts.

The invention shown in this division of the patent consists in combining with the spokes of a wheel a tire and metallic felly, forming a T-bar, and spoke sockets or supporting pieces arranged on alternate sides of the felly, whereby strength and durability are secured to the wheel.

A represents the hub of a wheel, which may be made of wood or of iron, or partly of wood and partly of iron.

B are the spokes, which may be solid or tubular, and which have screw-threads cut upon their inner ends to screw into screw-holes in the hub A.

C is a felly, which is made of a piece of bar iron or steel bent edgewise into a circle and having its ends welded together. The felly C may be made plain, or it may be crimped or corrugated between the spokes B. The outer ends of the spokes B are placed alternately upon the opposite sides of the felly C, and preferably held in keepers or sockets D, and the said keepers or sockets secured to the sides of the felly C. With this construction the keepers D hold the ends of the spokes B in place, and also form an additional support to the tire E, which can be shrunk on in the ordinary manner.

If desired, keepers D can be attached to the felly C between the spokes B, to further support the tire E, in which case the ends of the spokes are riveted to the side of the felly. This construction gives to the wheel the strength of a T-iron rim, and at a much less expense.

It will be noted that the felly C and tire E are made in separate parts. In constructing the wheel the tire is shrunk on in the usual manner.

The oil-chamber in the end of the hub constitutes the subject of the other division of this patent, and no claim consequently is laid to it herein.

Having thus described our invention, we claim as new and desire to secure by Letters Patent—

1. In a vehicle-wheel, the combination, with the spokes B, of the tire and felly, each made in separate parts and forming a T-bar, and sockets secured on each side of said felly, substantially as shown and described.

2. In a vehicle-wheel, the combination, with spokes B, screwed at one end into hub A, of the tire E and felly C, constructed as described, with supporting-pieces D, secured on alternate sides of said felly, substantially as shown and described.

In testimony whereof we affix our signatures in presence of two witnesses.

CHARLES W. BALL.
THOMAS DAVIS.

In presence of—
C. H. FAILING,
D. W. MCINTYRE.